G. MARSHALL.
NAIL STRIPPER DEVICE.
APPLICATION FILED JULY 23, 1917.
1,269,544.
Patented June 11, 1918.
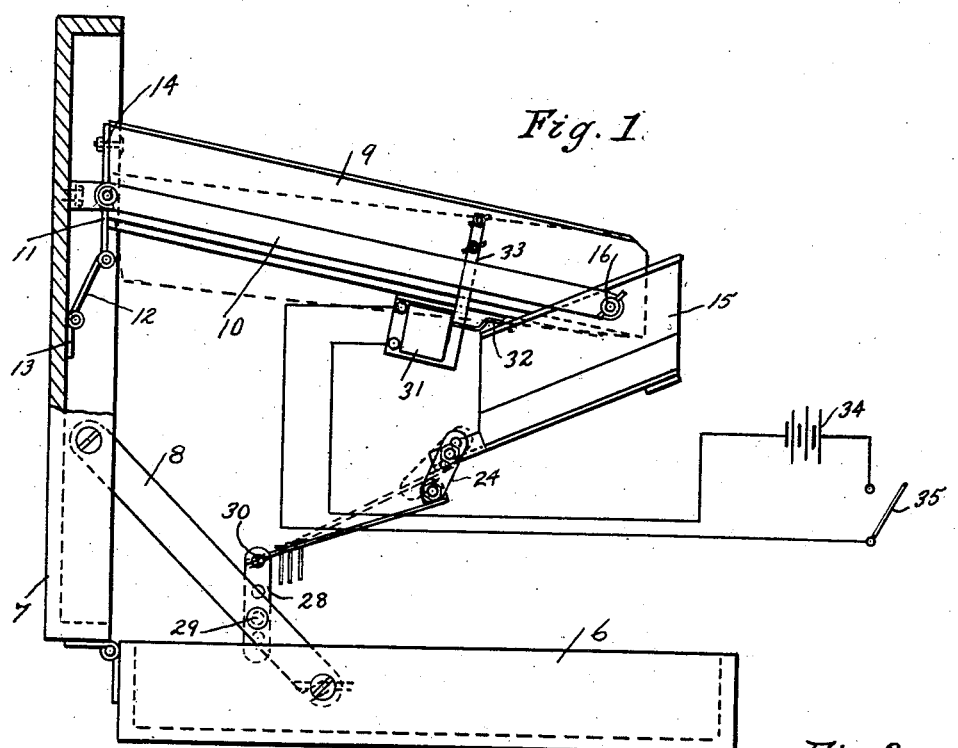
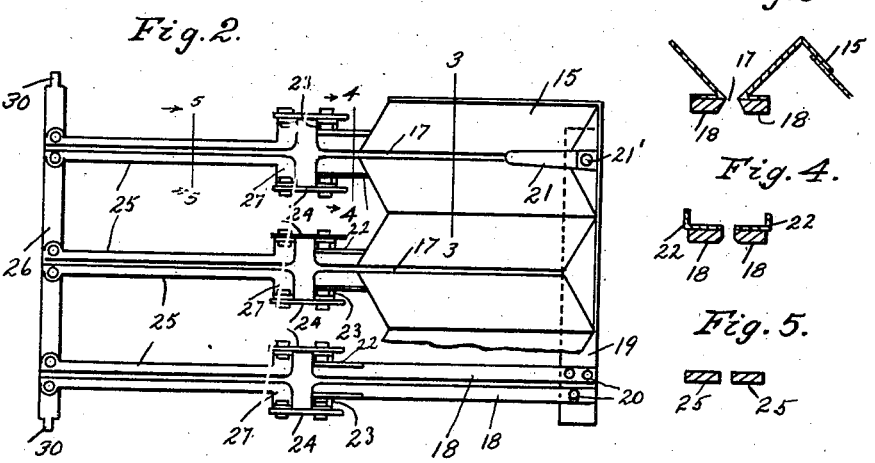
Inventor,
George Marshall.
By Westall and Wallace
His Attorneys.

UNITED STATES PATENT OFFICE.

GEORGE MARSHALL, OF LOS ANGELES, CALIFORNIA.

NAIL-STRIPPER DEVICE.

1,269,544.

Specification of Letters Patent.

Patented June 11, 1918.

Application filed July 23, 1917. Serial No. 182,212.

*To all whom it may concern:*

Be it known that I, GEORGE MARSHALL, a citizen of the United States, residing at Los Angeles, in the county of Los Angeles and State of California, have invented new and useful Improvements in Nail-Stripper Devices, of which the following is a specification.

This invention relates to a nail stripper having an upper nail containing hopper and an under hopper, which receives nails from the upper hopper. The invention resides in improvements in the nail starting means and the runner cut-off as compared with the invention disclosed in my patent for nail-stripper 1,204,678, Nov. 14, 1916.

An object of this invention is to provide the stripper with means for starting nails from the upper hopper to the under hopper; and with means for adjusting the inclination of the upper hopper independent of the lower hopper.

This invention relates to a stripper having runners extending from the under hopper interrupted by an open space, thereby forming a cut-off for wasting nails when the lower sections of the runners are full. Another object of my invention is to provide means for adjusting the cut-off for most efficient operation with a selected size of nail.

This invention further contemplates details of structure, whereby simplicity, certainty and efficiency of operation and ease of manipulation are obtained.

I accomplish these objects by means of the embodiment of my invention illustrated in the accompanying drawing, in which:

Figure 1, is a side elevation of the complete stripper. Fig. 2, is a plan view of the under hopper and runners, part of one of the hoppers being broken away. Fig. 3, is a section as seen on the line 3—3 of Fig. 2. Fig. 4, is a section as seen on the line 4—4 of Fig. 2. Fig. 5, is a section as seen on the line 5—5 of Fig. 2.

The nail stripper is of the portable type, and is mounted in a box comprising a body portion 6 and a lid or cover 7 hinged thereto. When the stripper is set up for use, the lid 7 is held open by means of braces 8. The upper hopper 9 is secured to the lid 7 by means of a supporting frame having side arms 10 which are secured to the lid at one end by means of brackets, and pivotally support the hopper 9 at the other end as will be later described. A side wall of the lid is shown partly broken away to better illustrate the construction. The end of the hopper 9 adjacent the lid is adjustably supported by means of a strap 11 pivotally secured to a link 12 which is in turn pivotally secured to a leaf 13 fixed to the lid 7. A bolt 14 extends through an elongated slot in the strap 11 and through an aperture in the end wall of the hopper 9. By loosening the nut on bolt 14 and moving the end of the hopper 9 upwardly or downwardly the inclination of the hopper may be adjusted to provide for the free flow of nails, the inclination varying with the size of nails being used. When the hopper is properly adjusted the nut on bolt 14 is tightened, thereby securing the upper hopper in position.

The under hopper 15 is pivotally secured to the side arms 10 by means of bolts 16 which pass through the side walls of the hopper 15. The bolts 16 may be provided with winged nuts to make adjustment easy. The under hopper 15 has a corrugated bottom in which there are slots 17. The slots 17 are adjusted in width. As indicated particularly in Fig. 3 the bottom sections of the under hopper are secured to rails 18 which form runners. The runners 18 are secured to cross bar 19 by means of bolts disposed in elongated slots in the runners. On loosening the bolts 20, the runners 18 may be moved to and from each other to obtain the proper width of slot for any given size of nail. At the head end of the slots are starters 21, which consist of strips, each overlying a slot and secured to the end wall of the hopper by means of a bolt 21', so that the starters 21 may be adjusted by moving them up or down to fit snugly in place when the slots 17 are adjusted. The starters 21 prevent the nails from locking in the slots at the head end of the hopper. The lower ends of runners 18 are provided with guards 22 to prevent nails from accumulating or piling up on the links, which secure the upper sections of the runners to the lower sections.

Laterally off-set from the runner sections 18 are bracket portions 23 to provide means for attaching the links 24. The lower sections of the runners 25 are adjustably secured to the cross bar support 26 to provide for adjustment of the width of the slot in the lower sections of the runners. The head ends of the lower sections of the runners have outwardly bent portions 27 forming brackets for connection of the links 24. The lower ends of links 24 are provided with apertures registering with corresponding apertures in the brackets 27. Bolts pass through the registering apertures thereby securing the links 24 to the lower section of the runners. The upper ends of the links are slotted to register with apertures in the brackets 23 on the upper sections of the runners. Bolts pass through the registering slots and apertures. This means of connection provides for adjusting the distance of the space or cut-off between the runner sections. The dotted lines in Fig. 1 show what adjustment may be made in the runners.

Supporting bars 28 are secured to the braces 8 by means of bolts 29. The ends of the cross bar support 26 are reduced in size and indicated by 30 and arranged to be disposed in apertures in the bars 28. Bars 28 have a number of apertures so that the height of the cross bar support 26 may be adjusted.

In order to start the flow of nails from the upper hopper 9, which acts as a container, to the under hopper 15, I have provided a vibrator 31. Vibrator 31 is preferably an electro mechanical vibrator of the electric bell type, and is provided with a clapper 32 disposed to strike the bottom of hopper 9. A bracket 33 is shown detachably secured to the side of hopper 9 and is for the purpose of supporting the vibrator 31. The vibrator is shown included in an electrical circuit in which a battery 34 and a switch 35 are conventionally represented. The switch 35 is preferably of the push button type and may be installed at any place convenient for operation.

The upper hopper 9 is filled with a quantity of nails, and the vibrator 31 is then operated. If the push button 35 is installed on a bench at the front so that the box maker may press his body against the button, he may thereby keep his hands and arms free for work. During the operation of the vibrator the nails are shaken and flow into the under hopper 15. They slide downwardly to the starters 21, and then down toward the lower end of the hopper 15. The shanks of some of the nails will pass through the slots 17 with the heads remaining above the runner, and are guided in their further movement by the runners. These nails which are guided by the runners move downwardly and across the cut-off, jumping from the upper sections of the runners to the lower sections and gradually filling the slots in the lower sections. When the slots in the lower runners have become filled, the remaining nails which pass through the cut-off will drop into the body 6 of the box, the latter serving as a container for the wasted nails. The nails whose shanks do not pass through the slot in the upper sections of the runner will slide from the runners and waste at the cut-off. In order that the nails which are guided by the upper runners may pass through the cut-offs to the slots in the lower runners without wasting, it is necessary that the cut-offs be properly adjusted. A cut-off should also be adjusted so that after the slot in the lower section of the runners is filled, the nails will waste without piling up and locking at the cut-off. The adjustment of the cut-off depends upon the size of the nails. The links 24 provide for proper adjustment to obtain most efficient operation of the stripper.

I have also constructed the slots in the upper section runners so that the greatest number of nails will pass into the slot and locking of nails which pass into the slot at opposite inclinations will be prevented. The slot adjacent the cut-off has the walls gradually straightened so that they are perpendicular as indicated in Fig. 4. At the upper end of the slot the walls are tapered as shown in Fig. 3. It is obvious that as the nails approach the cut-off they are straightened so that they pass from the upper to the lower sections in an upright position.

It is obvious that the vibrator saves the time of the box maker as it is not necessary for him to stir up the nails in the upper hopper in order to fill the slot in the lower section of the runners. As soon as the lower sections of the runners are emptied, the nails may be started by leaning against the push button 35 to close the electrical circuit and operate the vibrator. The adjustment of the cut-off provides means for obtaining the greatest number of nails in the slot with the least amount of waste.

What I claim is:—

1. A nail stripper comprising in combination a support, an upper hopper adjustably secured thereto for variation of its inclination, an under hopper secured to said support for receiving nails from said upper hopper, and an electro-mechanical vibrator secured to said upper hopper for jarring the latter.

2. A nail stripper comprising in combination a supporting frame, an upper hopper pivotally secured at one end to said frame, means to adjustably support the other end of said upper hopper, whereby the inclination thereof may be varied, an under hopper pivotally secured to said frame and disposed so as to receive nails from said upper hopper and vibrator means for jarring said upper hopper.

3. A nail stripper comprising in combination a supporting frame, an upper hopper pivotally secured at one end to said frame, means to adjustably support the other end of said hopper, whereby the inclination thereof may be varied, an under hopper pivotally secured to said frame and disposed so as to receive nails from said upper hopper, and an electro mechanical vibrator secured to said upper hopper.

4. The combination of an upper hopper, an under hopper disposed so as to receive nails from said upper hopper, runners secured to said under hopper, said runners being interrupted to form a cut-off, said cut-off being adjustable, and a vibrator for jarring said upper hopper.

5. In a nail stripper the combination of an under hopper having runners for supporting nails by their heads comprising upper and lower sections, said upper section being disposed to guide nails received in said hopper, and adjustable means off-setting the said upper and lower sections to form an adjustable cut-off.

6. In a nail stripper the combination of an under hopper having runners comprising upper and lower sections, said upper section being disposed to guide nails received in said hopper, and links securing the lower to said upper section to form a cut-off, said links being pivotally and longitudinally adjustable with respect to said runners, whereby the cut-off may be adjusted.

In witness that I claim the foregoing, I have hereunto subscribed my name, this 16th day of July, 1917.

GEORGE MARSHALL.

Copies of this patent may be obtained for five cents each, by addressing the "Commissioner of Patents, Washington, D. C."